United States Patent [19]

Hoxmeier et al.

[11] Patent Number: 5,013,798
[45] Date of Patent: May 7, 1991

[54] HYDROGENATION CATALYST AND HYDROGENATION PROCESS WHEREIN SAID CATALYST IS USED

[75] Inventors: Ronald J. Hoxmeier, Houston; Lynn H. Slaugh, Cypress, both of Tex.

[73] Assignee: Shell Oil Corporation, Houston, Tex.

[21] Appl. No.: 527,924

[22] Filed: May 24, 1990

[51] Int. Cl.$^5$ .............................................. C08F 8/04
[52] U.S. Cl. ................................... 525/338; 525/339; 525/332.8; 525/332.9; 525/333.1; 525/333.2
[58] Field of Search ................ 525/338, 339; 585/270, 585/277

[56] References Cited

U.S. PATENT DOCUMENTS

| | | | |
|---|---|---|---|
| 2,931,792 | 4/1960 | Aries | 260/93.5 |
| 3,061,602 | 10/1962 | Duck et al. | 260/94.9 |
| 3,113,986 | 12/1963 | Breslow et al. | 260/683.9 |
| 3,412,174 | 11/1968 | Kroll | 260/683.9 |
| 3,657,159 | 4/1972 | Vandenberg | 260/2 |
| 3,969,332 | 7/1976 | Gloriod et al. | 526/128 |
| 3,991,259 | 11/1976 | Piekarski et al. | 526/97 |
| 4,271,323 | 6/1981 | Durand et al. | 568/816 |
| 4,544,646 | 10/1985 | Pullukat et al. | 502/109 |
| 4,876,314 | 10/1989 | Hoxmeier et al. | 525/338 |

FOREIGN PATENT DOCUMENTS 131420 7/1984 European Pat. Off. .

*Primary Examiner*—Patrick P. Garvin
*Assistant Examiner*—Brent M. Peebles

[57] ABSTRACT

A hydrogenation catalyst prepared by combining a Group VIIIA metal compound and a hydrocarbyl-substituted silicon alumoxane and a hydrogenation process wherein said catalyst is used to hydrogenate compounds containing ethylenic and/or aromatic unsaturation. The Group VIIIA metal compound is selected from the group of compounds consisting of carboxylates, chelates, alkoxides, salts of hydrocarbon acids containing sulfur and salts of partial half esters of hydrocarbyl acids containing sulfur. Nickel, cobalt and palladium compounds are particularly preferred for use in the hydrogenation catalyst. Hydrogenation catalysts prepared with hydrocarbyl-substituted silicon slumoxanes initially exhibit less hydrogenation activity than catalysts known heretofore in the prior art and prepared with a metal alkyl of a metal selected from Groups, I, II and III. These catalysts, then afford greater control over the extent of hydrogenation, particularly when partial hydrogenation is a desired end result. Ultimately, however, the catalyst permits substantially complete hydrogenation of both ethylenic and aromatic unsaturation.

19 Claims, No Drawings

HYDROGENATION CATALYST AND HYDROGENATION PROCESS WHEREIN SAID CATALYST IS USED

BACKGROUND

1. Field of the Invention

This invention relates to a hydrogenation catalyst and a hydrogenation process wherein said catalyst is used. More particularly, this invention relates to a hydrogenation catalyst and to a process wherein said catalyst is used to saturate ethylenic and/or aromatic unsaturation.

2. Prior Art

Catalyst for hydrogenating chemical compounds containing ethylenic and/or aromatic unsaturation, are, of course, well known in the prior art. Useful catalysts include such heterogeneous catalysts as nickel on kieselguhr, Raney nickel, copper chromate, molybdenum sulfide, finely divided platinum, finely divided palladium, platinum oxide, copper chromium oxide and the like, as taught, for example, in U.S. Pat. No. 3,333,024. Useful catalysts also include homogeneous systems such as those prepared with rhodium compounds or complexes, as taught, for example, in U.K. Patent No. 1,558,491 and in U.S. Pat. Nos. 4,581,417 and 4,674,627 and those prepared with ruthenium complexes as taught, for example, in U.S. Pat. No. 4,631,315. As is known in the prior art, certain of these catalysts are quite effective in the hydrogenation of ethylenic unsaturation but many of these catalysts are not selective as between ethylenic and aromatic unsaturation and therefore cannot be effectively used to selectively hydrogenate ethylenic unsaturation in a compound containing both ethylenic and aromatic unsaturation. Catalysts which are useful in the hydrogenation of ethylenic unsaturation, which catalyst may be used selectively as between ethylenic and aromatic unsaturation, include catalysts which are frequently referred to as homogeneous systems, prepared by combining an iron group metal compound, particularly a nickel or cobalt compound, with a reducing agent. Such catalyst may be the reaction product of an iron group metal alkoxide and an aluminum hydrocarbon compound as taught, for example, in U.S. Pat. No. 3,113,986; the reaction product of an iron group metal carboxylate, chelate or alkoxide and a lithium or magnesium hydrocarbon compound as taught, for example, in U.S. Pat. No. 3,541,064; the reaction product of a nickel or cobalt alkoxide or carboxylate and an aluminum trialkyl as taught, for example, in U.S. Pat. No. 3,700,633 or the reaction product of an iron group carboxylate, an enolate, a phenolate or a salt of certain sulfur-containing acids and half esters thereof and a metal alkyl of a metal selected from Groups I, II and III as taught for example in British Patent Specification No. 1,030,306. It is also known to use iron group metal compounds containing from about 0.5 to about 1.3 mols of water per mole of iron group metal compound in preparing catalysts of this type. Reducing agents that may be used in preparing catalysts include metal alkoxides as taught, for example, in U.S. Pat. Nos. 3,412,174 and 4,271,323. As is known in the prior art, these catalysts can be used in a manner such that essentially all of any ethylenic unsaturation contained in the chemical compound is hydrogenated while essentially none of the aromatic unsaturation contained therein is hydrogenated. These catalysts are, however, generally less active than the non-selective catalysts heretofore known in the prior art, and, as a result, longer holding times are generally required to effect the desired degree of selective hydrogenation. Moreover, most, if not all, of these selective catalysts generally result in significant conversion of ethylenic unsaturation in relatively short contacting times and then proceed rather slowly with respect to such conversion thereafter, thereby preventing good control over the extent of conversion of the ethylenic unsaturation when partial hydrogenation is the desired objective. In light of these deficiencies, then, the need for a catalyst which can be used to selectively hydrogenate ethylenic unsaturation in a chemical compound containing both ethylenic and aromatic unsaturation, which catalyst will provide as great an extent of hydrogenation after a reasonable contacting time when compared to the selective catalyst known in the prior art is believed to be readily apparent. The need for a catalyst which will afford better control over the extent of hydrogenation is also believed to be readily apparent.

SUMMARY OF THE INVENTION

It has now been discovered that the foregoing and other disadvantages of the prior art catalyst and processes useful in hydrogenating ethylenic and/or aromatic unsaturation can be overcome or at least significantly reduced with the catalyst and process of this invention. It is, therefore, an object of the present invention to provide an improved catalyst for hydrogenating ethylenic and/or aromatic unsaturation. It is another object of this invention to provide a hydrogenation process wherein said improved catalyst is used to hydrogenate ethylenic and/or aromatic unsaturation. It is still another object of this invention to provide such an improved hydrogenation catalyst which can be used to selectively hydrogenate ethylenic unsaturation when aromatic unsaturation is also present. It is a still further object of this invention to provide such an improved hydrogenation catalyst which will enable as good an extent of hydrogenation after a reasonable holding time as that provided by known selective hydrogenation catalyst. It is even a further object of this invention to provide certain improved hydrogenation catalysts which will afford better control over the extent to which the hydrogenation has proceeded. The foregoing and other objects and advantages will become apparent from the description set forth hereinafter.

In accordance with the present invention, the foregoing and other objects and advantages are accomplished with a catalyst obtained by contacting one or more Group VIIIA metal compounds and one or more compounds containing aluminum, silicon, oxygen and hydrocarbyl groups, said compound hereinafter frequently being referred to as a silicon alumoxane compound, and with a process wherein said catalyst is used to partially or completely hydrogenate ethylenic and/or aromatic unsaturation. As used herein, all reference to metals of a specified Group shall be by reference to the Groups as depicted in the Periodic Table of the Elements by Mendeleev, Long Form, as published in Kirk-Othmer Encyclopedia of Chemical Technology, 2nd, 1964, Vol. 8, Page 94. As discussed more fully hereinafter, the catalysts of this invention may also be used to selectively hydrogenate ethylenic unsaturation in a compound containing both ethylenic and aromatic unsaturation. As also discussed more fully hereinafter, the extent of hydrogenation, initially at least, proceeds rather slowly with certain of the catalysts herein contemplated, thereby making it possible to more accurately control the extent of hydrogenation when partial hydrogenation is a desired result. The catalysts further may be used at more severe hydrogenation conditions so as to hydrogenate both ethylenic and aromatic unsaturation in compounds containing both types of unsaturation.

DETAILED DESCRIPTION OF THE INVENTION

As just indicated supra, the present invention is drawn to a catalyst prepared by contacting one or more Group VIIIA metal compounds with one or more compounds containing silicon, aluminum, oxygen and hydrocarbyl groups and to a hydrogenation process wherein said catalyst is used to partially or completely hydrogenate ethylenic and/or aromatic unsaturation. The catalysts of this invention will, frequently, be referred to herein as useful to selectively hydrogenate ethylenic unsaturation in a compound containing both ethylenic and aromatic unsaturation. Certain of the catalysts of this invention may further be useful to more carefully control the extent of hydrogenation in such compounds when partial hydrogenation is an objective. The catalyst may still further be useful, generally, at more severe hydrogenation conditions so as to hydrogenate at least a portion of both the ethylenic and aromatic unsaturation in compounds containing both types of unsaturation.

In general, any of the Group VIIIA metal compounds known to be useful in the preparation of catalysts for the hydrogenation of ethylenic unsaturation can be used to prepare the catalyst of this invention. Suitable compounds, then, include Group VIIIA metal carboxylates having the formula $(RCOO)_nM$ wherein M is a Group VIIIA metal, R is a hydrocarbyl radical having from 1 to about 50 carbon atoms, preferably from about 5 to 30 carbon atoms, and n is a number equal to the valence of the metal M; Group VIIIA metal chelates containing from about 3 to about 50 carbon atoms, preferably from about 3 to about 20 carbon atoms; Group VIIIA metal alkoxides having the formula $(RCO)_nM$ wherein M is again a Group VIIIA metal, R is a hydrocarbon radical having from 1 to about 50 carbon atoms, preferably about 5 to about 30 carbon atoms, and n is a number equal to the valence of the metal M; Group VIIIA metal salts of sulfur-containing acids having the general formula $M(SO_x)_n$ and partial esters thereof having the general formula $M(SO_xR'_y)_n$ wherein M is a Group VIIIA metal, x is a whole number equal to 2, 3 or 4, y is a whole number at least one less than x equal to 1, 2, or 3, R is a hydrocarbon radical having from 1 to about 20 carbon atoms and n is a number equal to the valence of the metal M. Preferably, the Group VIII metal will be selected from the Group consisting of nickel, cobalt and palladium, most preferably, the Group VIIIA metal will be nickel. The carboxylates useful in preparing the catalyst of this invention include Group VIIIA metal salts of hydrocarbon aliphatic acids, hydrocarbon cycloaliphatic acids and hydrocarbon aromatic acids. Examples of hydrocarbon aliphatic acids include hexanoic acid, ethylhexanoic acid, heptanoic acid, octanoic acid, nonanoic acid, decanoic acid, dodecanoic acid, myristic acid, palmitic acid, stearic acid, oleic acid, linoleic acid, rhodinic acid and the like. Examples of hydrocarbon aromatic acids include benzoic acid and alkyl-substituted aromatic acids in which the alkyl substitution has from 1 to about 20 carbon atoms. Examples of cycloaliphatic acids include naphthenic acid, cyclohexylcarboxylic acid, abietic-type resin acids and the like. Suitable chelating agents which may be combined with a Group VIIIA metal thereby yielding a Group VIIIA metal chelate compound useful in the preparation of the catalyst of this invention include $\beta$-ketones, $\alpha$-hydroxycarboxylic acids, $\beta$-hydroxy carboxylic acids, $\beta$-hydroxycarbonyl compounds and the like. Examples of $\beta$-ketones which may be used include acetylacetone, 1,3-hexanedione, 3,5-nonadione, methyl-aceto acetate, ethyl-aceto acetate and the like. Examples of $\alpha$-hydroxycarboxylic acid which may be used include lactic acid, glycolic acid, $\alpha$-hydroxycarboxylic acid, $\alpha$-hydroxy-$\alpha$-phenylacetic acid, $\alpha$-hydroxycyclohexylacetic acid and the like. Examples of $\beta$-hydroxycarboxylic acids include salicylic acid, alkyl-substituted salicyclic acids and the like. Examples of $\beta$-hydroxylcarbonyl compounds that may be used include salicyl-aldehyde, o-hydroxyacetophenone and the like. The metal alkoxides which are useful in preparing catalysts of this invention include Group VIIIA metal alkoxides of hydrocarbon aliphatic alcohols, hydrocarbon cycloaliphatic alcohols and hydrocarbon aromatic alcohols. Examples of hydrocarbon aliphatic alcohols include hexanol, ethylhexanol, heptanol, octanol, nonanol, decanol, dodecanol and the like. The Group VIIIA metal salts of sulfur-containing acids and partial esters thereof include Group VIIIA metal salts of sulfonic acid, sulfuric acid, sulphurous acid, partial esters thereof and the like. Aromatic acids such as benzene sulfonic acid, p-toluene sulfonic acid and the like are particularly useful. The Group VIIIA metal compounds used to prepare the catalysts of this invention may, but need not contain water. When water is present, the amount of water present may range from about 0.5 up to about 1.3 moles of water per mole or atom of Group VIIIA metal.

In general, any compound containing one or more silicon atoms and one or more aluminum atoms, each of said silicon atoms being bonded to either another silicon atom or an aluminum atom either directly or through an oxygen atom and each of said aluminum atoms being bonded to another aluminum atom or a silicon atom either directly or through an oxygen atom, and at least one hydrocarbyl or hydrocarbyloxy group bonded to each silicon atom and at least one aluminum atom, preferably each silicon and each aluminum atom, which compound is capable of reducing a Group VIIIA metal compound useful in preparing the catalyst of this invention may be used as the hydrocarbyl-substituted silicon alumoxane compound in preparing the catalysts of this invention. Useful hydrocarbyl-substituted silicon alumoxanes, then, include those having the following general formula:

1. $R^1R^2R^3SiOAlR^4R^5$
2. $R^6R^7AlO(-SiR^8R^9O-)_n SiR^{10}R^{11}(-OAlR^{12}R^{13})_p$
3. $R^{14}R^{15}R^{16}SiO(-AlR^{17}O-)_{n'}AlR^{18}(-OSiR^{19}R^{20}R^{21})$
4. $(\phi_2 SiOAlR^{22}O)_{n''} AlR^{23}R^{24}$
5. $\phi_2 Si(-OAlR^{25}R^{26})_2$ wherein:
n and n' are, independently, numbers ranging from zero to about 20;
n" is a number ranging from about 1 to about 5;
p is a number ranging from 1 to 4; and
each of $R^1$–$R^{26}$, inclusive, are the same or a different radical selected from the group of radical consisting of the hydrogen radical, hydrocarbyl radicals having from 1 to about 20 carbon atoms and hydrocarbyloxy radicals having from 1 to about 20 carbon atoms and from 1 to about 5 oxygen atoms with the proviso that at least a sufficient number of $R^1R^2R^3$; $R^4R^5$; $R^6R^7$; $R^8R^9$; $R^{10}R^{11}$; $R^{12}R^{13}$; $R^{14}R^{15}R^{16}$; $R^{19}R^{20}R^{21}$; $R^{23}R^{24}$; $R^{25}R^{26}$; $R^{17}$; $R^{18}$ and $R^{22}$ be hydrocarbyl or hydrocarbyloxy such that each silicon atom and at least one aluminum atom in the compound have at least one hydrocarbyl or hydrocarbyloxy radical bonded thereto. When an R is hydrocarbyl or hydrocarbyloxy, the same may be a linear or branched alkyl group, a cycloalkyl or alkyl-substituted cycloalkyl group or an aromatic or alkyl-substituted aromatic group. It will, of course, be appreciated that when an R is cyclic, it will contain at least 3 carbon atoms and when an R is aromatic, it will contain at least 6 carbon atoms.

Compounds satisfying general formulae 1-3, inclusive, may be prepared using techniques well known in the prior art. For example, compounds satisfying general formula 1 may be prepared using processes such as those described in U.S. Pat. Nos. 3,661,878; 3,969,332; 4,036,867 and 4,472,519, the disclosure of which patents are herein incorporated by reference. Compounds satisfying general formula 2 may be prepared using a process such as that described in U.S. Pat. No. 3,657,159, the disclosure of which patent is herein incorporated by reference. Compounds satisfying general equation 3, at least when n' is zero, may be prepared using the method suggested in U.S. Pat. No. 3,969,332. Compounds satisfying general formula 4 may be prepared by reacting diphenylsilicondiol, $\phi_2Si(OH)_2$, with a trihydrocarbyl aluminum on an equimolar basis while compounds satisfying general formula 5 may be prepared by reacting these same compounds at a molar ratio of two moles aluminum reactant per mole silicon reactant.

In general, and as suggested supra, the hydrocarbyl-substituted silicon alumoxane compound may contain more silicon atoms than aluminum atoms; more aluminum atoms than silicon atoms, or the same number of silicon and aluminum atoms. Interestingly, it has been discovered that variance in the Si:Al atomic ratio of the hydrocarbyl-substituted silicon alumoxanes used to prepare the catalysts of this invention will vary the rate of hydrogenation when the catalyst are used therefor. Moreover, the variance in hydrogenation rate further varies as a function of hydrogenation time with each of the possible Si:Al atomic ratios at least with respect to combinations wherein the Si:Al atomic ratio is greater than one, equal to one or less than one. For example, when the hydrocarbyl-substituted silicon alumoxane contains: more silicon atoms than aluminum atoms and particularly a plurality of silicon atoms; e.g. 2 or 3 silicon atoms and a single aluminum atom, the initial rate of hydrogenation will be the slowest, thus affording the maximum amount of control over the extent of hydrogenation initially, but ultimately is the fastest, thus permitting complete or at least substantially complete hydrogenation in the shortest reaction time; with an equal number of silicon atoms and aluminum atoms, particularly one of each, the initially reaction rate is the fastest of the three possibilities but remains relatively slow for longer hydrogenation times, thus affording maximum control over the extent of hydrogenation at intermediate conversions; and with more aluminum atoms than silicon atoms and particularly a plurality of aluminum atoms; e.g. 2 or 3 aluminum atoms and a single silicon atom, the hydrogenation rate is intermediate of these two extremes throughout the hydrogenation reaction.

In general, the actual hydrogenation catalyst will be prepared by contacting the Group VIIIA metal component with the hydrocarbyl-substituted silicon alumoxane compound in a suitable solvent at a temperature within the range from about 20° C. to about 80° C. In general, the solvent used for preparing the catalyst may be anyone of those solvents known in the prior art to be useful as solvents for preparing unsaturated hydrocarbon polymers. Suitable solvents include aliphatic hydrocarbons such as hexane, heptane, octane and the like; cycloaliphatic hydrocarbons such as cyclopentane, cyclohexane, and the like; alkyl-substituted cycloaliphatic hydrocarbons such as methylcyclopentane, methylcyclohexane, methylcyclooctane and the like; aromatic hydrocarbons such as benzene, hydroaromatic hydrocarbons such as decalin, tetralin and the like; alkyl-substituted aromatic hydrocarbons such as toluene, xylene and the like; halogenated aromatic hydrocarbons such as chlorobenzene and the like; linear and cyclic ethers such as methyl ether, ethyl ether, tetrahydrofuran and the like; and ketones such as methyl ketone (acetone) methylethyl ketone, ethyl ketone (3-pentanone) and the like. In general, a suitable hydrogenation catalyst can be prepared by combining the components used to prepare catalyst in a separate vessel prior to feeding the same to the hydrogenation reactor or the separate components can be fed directly to the hydrogenation reactor when the hydrogenation is accomplished at a temperature at which the separate components will yield an active catalyst. Preferably, the Group VIIIA metal compound will be combined with the hydrocarbyl-substituted silicon alumoxane in a separate vessel prior to feeding the reaction product to the hydrogenation reactor. In general, the components used to prepare the catalyst will be combined in a ratio sufficient to provide from about 0.5 to about 20 moles or atoms of aluminum per mole or atom of Group VIIIA metal when the catalyst is prepared.

In general, the hydrogenation catalyst of this invention may be used to hydrogenate any hydrocarbon or substituted hydrocarbon containing either ethylenic unsaturation and/or aromatic unsaturation. The catalyst of this invention is particularly useful for the hydrogenation of hydrocarbon and substituted hydrocarbon polymers. When the hydrocarbon or substituted hydrocarbon polymer to be hydrogenated contains both ethylenic and aromatic unsaturation, the hydrogenation catalyst of this invention can be used at catalyst concentrations, hydrogenation temperature, hydrogen partial pressures and nominal holding times which will enable partial, complete or selective hydrogenation. In this regard, it will be appreciated that ethylenic unsaturation, particularly that which does not contain hydrocarbyl-substitution on both of the carbon atoms contained in the ethylenic unsaturation group will hydrogenate at milder hydrogenation conditions than will aromatic unsaturation. As a result, selective hydrogenation can be accomplished such that at least a portion of the ethylenic unsaturation is hydrogenated while essentially none of the aromatic unsaturation is hydrogenated. In fact, selective hydrogenation can be accomplished with the hydrogenation catalyst of this invention such that substantially all of the ethylenic unsaturation which does not contain hydrocarbyl substitution on both of the carbon bonds contained in the ethylenic unsaturation can be saturated while essentially none of the aromatic unsaturation is hydrogenated. At more severe conditions, however, at least a portion of the aromatic unsaturation will also be hydrogenated and if contacting is continued for a sufficient period of time at severe enough conditions substantially all of the ethylenic and aromatic unsaturation can be hydrogenated.

The hydrogenation catalyst of this invention may be used to hydrogenate essentially any unsaturated compound including polymers containing ethylenic and/or aromatic unsaturation. The hydrogenation catalyst of this invention will also hydrogenate any acetylenic unsaturation that may be contained in the unsaturated compound. In general, however, and while the unsaturated polymer or other hydrocarbon may be substituted with various functional groups, the polymers or other hydrocarbons actually hydrogenated with the hydrogenation catalyst of this invention should be essentially free of functional groups that will react with the catalyst thereby deactivating the same. In general, such groups include both those which are strongly acidic ($pH \leq 5$) and those which are strongly basic ($pH \geq 9$). The substitutions that may be on the hydrocarbon, then, would be those which, when dissolved in water, would have a pH greater than about 5 and less than about 9.

The hydrogenation catalyst of this invention will be particularly effective for hydrogenating polymers containing ethylenic unsaturation and/or aromatic unsaturation. As is well known, polymers containing ethylenic unsaturation can be prepared by polymerizing one or more polyolefins, particularly diolefins. The polyolefins may be polymerized alone or in combination with other vinyl monomers such as alkenylaromatic hydrocarbons, acrylates, methacrylates, vinyl- and allylalcohols, vinyl and allyl ethers, vinyl halides, vinylidene halides, and the like. Polymers containing aromatic unsaturation may be prepared by polymerizing one or more alkenyl aromatic hydrocarbons. The alkenyl aromatic hydrocarbons may be polymerized alone or in combination with other copolymerizable vinyl monomers such as polyolefins, acrylates, methacrylates, vinyl and allyl ethers, vinyl halides, and the like to produce polymers containing aromatic unsaturation. As is also well known, polyolefins, particularly conjugated diolefins, and alkenyl aromatic hydrocarbon, particularly monoalkenyl aromatic hydrocarbons, can be copolymerized to product polymers containing both ethylenic and aromatic unsaturation. The hydrogenation catalyst of this invention may be used to either partially or substantially completely hydrogenate ethylenic unsaturation contained in such a polymer. The hydrogenation catalyst of this invention may also be used to either partially or completely hydrogenate aromatic unsaturation contained in such a polymer. The hydrogenation catalyst of this invention may further be used to selectively hydrogenate ethylenic unsaturation in polymers containing both ethylenic and aromatic unsaturation. As used herein, the recitation "selective hydrogenation" shall mean hydrogenation accomplished such that ethylenic unsaturation is hydrogenated while aromatic unsaturation is not or at least wherein the relative amount of ethylenic unsaturation hydrogenated is significantly greater than the relative amount of aromatic unsaturation hydrogenated.

As is well known in the prior art, polymers containing ethylenic and/or aromatic unsaturation may be prepared using free-radical, cationic and anionic initiators or polymerization catalysts. Such polymers may also be prepared using bulk, solution or emulsion techniques. It is, of course, known in the prior art that all polymers cannot be prepared with each of these initiators or catalysts and that all polymers cannot be prepared with each of the different techniques. Which polymers may be prepared with the several catalysts and which polymers may be prepared with the various techniques is, however, well known in the prior art and need not be discussed herein in detail. As indicated more fully hereinafter, however, the actual hydrogenation will be accomplished in solution. It is, therefore, important to the hydrogenation method of this invention that the unsaturated hydrocarbon or substituted hydrocarbon be soluble in a solvent.

As indicated supra, the hydrogenation catalyst of this invention is particularly useful for hydrogenating hydrocarbon polymers containing ethylenic and/or aromatic unsaturation. The present invention will, therefore, be described in greater detail by reference to such polymers. It should, however, be kept in mind, as also indicated supra, that any unsaturated hydrocarbon or substituted-unsaturated hydrocarbon or any unsaturated polymer which is also soluble in a suitable solvent could be substituted for the hydrocarbon polymer with which the invention will be described in greater detail. Also, while the polymer actually hydrogenated may be prepared using bulk, solution or emulsion techniques, as indicated supra, the invention is particularly effective with polymers prepared in solution since the hydrogenation may be accomplished immediately after preparation thereof with a reduced number of steps. Polymers prepared with bulk or emulsion techniques, however, could be recovered and then dissolved in a solvent to effect hydrogenation with the hydrogenation catalyst of this invention.

As is well known, homopolymers of conjugated diolefins, copolymers of conjugated diolefins and copolymers of one or more conjugated diolefins and one or more other monomers, particularly a monoalkenyl aromatic hydrocarbon monomer, are commonly prepared in solution with an anionic polymerization initiator and the hydrogenation catalyst of this invention is particularly effective in both the partial, complete and selective hydrogenation of such polymers. As is well known, such polymers may be random, tapered, block, branched or radial. In general, polymers of this type are prepared by contacting the momomer or monomers to be polymerized with an organoalkali metal compound in a suitable solvent at a temperature within the range from about $-150°$ C. to about 300° C., preferably at a temperature within the range from about 0° C. to about 100° C. When the polymer is to be tapered, all of the monomers to be contained in the polymer are, frequently, introduced together at the beginning of the polymerization. When the polymer is to be random, a randomizing agent may generally be used. When the polymer is to be a linear block, the monomers are, generally, polymerized sequentially and when the polymer is to be a radial polymer, the polymeric arms are first prepared and then coupled with a satisfactory coupling agent. Particularly effective anionic polymerization initiators are organolithium compounds having the general formula:

$$RLi_n$$

wherein: R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized separately or in combination anionically include those conjugated diolefins containing from 4 to about 12 carbon atoms such as 1,3 butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 6 carbon atoms are, preferably, used in such polymers and conjugated diolefins containing 4 or 5 carbon atoms are most preferably used in such polymers. The conjugated diolefin polymers prepared via anionic initiation may contain one or more other monomers, particularly a monoalkenyl aromatic hydrocarbon monomer. Suitable monoalkenyl aromatic hydrocarbon monomers include styrene, various alkyl-substituted styrenes, alkoxy-substituted styrenes, vinyl naphthalene, alkyl-substituted vinyl naphthalenes and the like. Conjugated diolefin polymers which may be hydrogenated with the hydrogenation catalyst of the present invention include those homopolymers and copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin polymers which may be partially, completely or selectively hydrogenated with the hydrogenation catalyst of this invention also include block copolymers such as those described in U.S. Pat. Nos. 3,231,635; 3,265,765 and 3,322,856, the disclosure of which patents are also incorporated herein by reference. In general, linear block copolymers which may be hydrogenated in accordance with the present invention may be represented by the general formula:

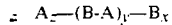
$$A_z{-}(B{-}A)_y{-}B_x$$

wherein:

A is a polymeric block comprising predominantly monoalkenyl aromatic hydrocarbon monomer units;

B is a polymeric block containing predominantly conjugated diolefin monomer units;

x and z are, independently, a number equal to 0 or 1; and y is a whole number ranging from 1 to about 15.

Conjugated diolefin polymers which may be partially, completely or selectively hydrogenated with the hydrogenation catalyst of this invention further include radial block copolymers such as those described in U.S. Pat. Nos. 4,033,888; 4,077,893; 4,141,847; 4,391,949 and 4,444,953, the disclosure of which patents are also incorporated herein by reference. Radial block copolymers which may be hydrogenated with the hydrogenation catalyst of the present invention may be represented by the general formula:

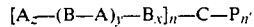
$$[A_z{-}(B{-}A)_y{-}B_x]_n{-}C{-}P_{n'}$$

wherein:

A, B, x, y and z are as previously defined;

n is a number from 3 to about 30;

c is the core or nucleus of the radial polymer formed with a polyfunctional coupling agent;

Each P is the same of a different polymer block or polymer segment having the general formula:

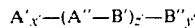
$$A'_{x'}{-}(A''{-}B')_{z'}{-}B''_{n'}$$

wherein:

A' is a polymer block or segment comprising predominantly monoalkenyl aromatic hydrocarbon monomer units which may be the same or different from A and A'' when A'' is block;

(A''—B'')_ is a polymer block or segment containing monoalkenyl aromatic hydrocarbon monomer units, A'', and conjugated diolefin monomer units, B', wherein the A''—B' monomer units may be random, tapered or block and when block, A'' may be the same or different from A and A' and B' may be the same or different from B and B'';

B'' is a polymer block or segment comprising predominantly conjugated diolefin monomer units;

x' and z' are independently numbers equal to 0 or 1;

z' is a whole number ranging from 0 to about 15 and n' is a whole number ranging from 1 to about 30.

In general, hydrogenation of the unsaturated polymer with the hydrogenation catalyst of this invention may be accomplished in any of the solvents useful for preparing such polymers known in the prior art. Such solvents include straight- and branched-chain aliphatic hydrocarbons, cycloaliphatic hydrocarbons, alkyl-substituted cycloaliphatic hydrocarbons, aromatic hydrocarbons, alkyl-substituted aromatic hydrocarbons, linear and cyclic ethers, ketones and the like as previously described. In general, the solution of polymer and solvent will contain from about 1 wt % to about 30 wt % polymer and from about 99 wt % to about 70 wt % solvent.

In general, the hydrogenation will be accomplished at a temperature within the range from about 20° C. to about 175° C. at a hydrogen partial pressure within the range from about 50 psig to about 5,000 psig, preferably at a hydrogen partial pressure of 50 to 3000 psig and most preferably at a hydrogen partial pressure within the range from about 50 to about 950 psig. In general, the catalyst or the components thereof will be added in a concentration sufficient to provide from about 0.2 to about 100 mmoles of Group VIIIA metal per lb of polymer or other compound being hydrogenated. In general, contacting at hydrogenation conditions will be continued for a nominal holding time within the range from about 10 to about 360 minutes. It will, of course, be appreciated that the more severe hydrogenation conditions at longer nominal holding times will, generally, result in complete or near complete hydrogenation of the polymer while milder hydrogenation conditions and shorter holding times favor partial hydrogenation and may be used to effect selective hydrogenation as between ethylenic and aromatic unsaturation. Of the several variables available to control the extent of hydrogenation, temperature and catalyst concentration and nominal holding time, generally, have the greatest affect on the extent of hydrogenation, particularly where selective hydrogenation is the desired result. Hydrogen partial pressure, on the other hand, generally, has a lesser affect on severity as well as selectivity as between the hydrogenation of ethylenic unsaturation and hydrogenation of aromatic unsaturation. Nominal holding time will, of course, significantly affect the extent of hydrogenation in those cases where partial hydrogenation of either ethylenic unsaturation or aromatic unsaturation is the desired result.

In general, selective hydrogenation as between ethylenic and aromatic unsaturation will be accomplished at a temperature within the range from about 20° to about 100° C. at a total pressure within the range from about 100 to about 1,000 psig at a hydrogen partial pressure within the range from about 50 to about 950 psig and at a catalyst concentration within the range from about 0.4 to about 40 mmoles of Group VIIIA metal per pound of polymer or other compound being hydrogenated. Nominal holding times within the range from about 30 to about 240 minutes will, generally, be used to effect selective hydrogenation. In general, the hydrogenation catalyst of this invention can be used to effect substantially complete hydrogenation of any ethylenic unsaturation contained in a polymer without effecting any hydrogenation of any aromatic unsaturation contained in the same polymer. Partial hydrogenation of the ethylenic unsaturation in such a polymer can, of course, be accomplished by reducing the nominal holding time, the temperature, the catalyst concentration and/or the hydrogen partial pressure. In general, partial, complete and/or selective hydrogenation will be accomplished without any significant degradation of the polymer.

While the inventor does not wish to be bound by any particular theory, it is believed that when the components used to prepare the hydrogenation catalyst of this invention are combined a reaction occurs to form a catalyst. The catalyst thus formed is stable and can be stored for relatively long periods prior to use.

After hydrogenation of the polymer has been completed, the polymer may be recovered as a crumb using techniques well known in the art such as by adding a polar compound such as a ketone, alcohol or the like to the polymer solution thereby precipitating the polymer as a crumb. Alternatively, the solution may be contacted with steam or hot water and the solvent then removed by azeotropic distillation. Generally, these recovery techniques will also effectively remove a significant portion of the catalyst. To the extent that further catalyst removal is desired, however, methods well known in the prior art may be used. In general, a significant portion of the catalyst residue may be separated by contacting the polymer or polymer solution with a dilute acid.

The hydrogenated polymers produced by the method of this invention can be used in any of the applications well known in the prior art for such hydrogenated polymers. For example, hydrogenated conjugated diolefin polymers will have improved green strength and cold flow properties and may be used in as VI improvers, impact modifiers, in adhesive compositions and the like. Similarly, selectively hydrogenated conjugated diolefin-monoalkenyl aromatic hydrocarbon polymers may be used in various molding compositions, in adhesives compositions, as VI improvers, as impact modifiers and the like.

PREFERRED EMBODIMENT OF THE INVENTION

In a preferred embodiment of the present invention, a nickel carboxylate or alkoxide having from about 5 to about 30 carbon atoms, most preferably 5 to about 15 carbon atoms, will be combined with an alkyl-substituted silicon alumoxane compound containing silicon atoms and aluminum atoms to produce a hydrogenation catalyst. In the preferred embodiment, each of the alkyl groups of the alkyl-substituted silicon alumoxane may be the same or different and each will contain from about 1 to about 10 carbon atoms. The contacting between the components used to prepare the catalyst will be accomplished at a temperature within the range from about 25° C. to about 60° C. in a cycloaliphatic hydrocarbon solvent. In the preferred embodiment, the contacting will be accomplished at an Al:Ni atomic ratio within the range from about 1:1 to about 10:1 on a mole or atom basis and at an Si to Al mole ratio within the range from about 0.1 to about 10. In a more preferred embodiment of the present invention, a nickel carboxylate will be used and the nickel carboxylate will be selected from the group consisting of nickel octoate and nickel ethylhexanoate. In a most preferred embodiment, the alkyl-substituted silicon alumoxane compound will contain a plurality of silicon atoms and in an even more preferred embodiment 2 or 3 silicon atoms, and a single aluminium atom. In a preferred process embodiment of the present invention, the preferred catalyst will be used to selectively hydrogenate a block copolymer comprising at least one polymeric block containing predominantly mono-alkenyl aromatic hydrocarbon monomer units and at least one polymeric block containing predominantly conjugated diolefin monomer units. The recitation predominantly as used herein in connection with polymer block composition shall mean that the specified monomer or monomer types is the principal monomer or monomer type (at least about 85 wt %) contained in that polymer block. Other copolymerizable monomer units may, however, be present. In the preferred embodiment, the monoalkenyl aromatic hydrocarbon polymer blocks will have a weight average molecular weight within the range from about 5,000 to about 40,000 and the conjugated diolefin polymer blocks will have a weight average molecular weight within the range from about 25,000 to about 125,000. In a preferred process embodiment, the hydrogenation will be accomplished in a cycloaliphatic hydrocarbon solvent, the solution containing from about 10 to about 25 wt % polymer and from about 95 to about 75 wt % solvent. In the preferred process embodiment, the hydrogenation will be accomplished at a temperature within the range from about 20° to about 100° C. at a total pressure within the range from about 100 to about 1,000 psig and at a hydrogen partial pressure within the range from about 50 to about 950 psig and at a catalyst concentration within the range from about 2 to about 10 mmoles of Ni per pound of polymer. In a most preferred process embodiment, the hydrogenation conditions will be continued for a nominal holding time within the range from about 30 to about 180 min. In the preferred process embodiment, the selective hydrogenation will be accomplished so as to hydrogenate at least 80% of the ethylenic unsaturation initially contained in the polymer and less than about 5% of the aromatic unsaturation contained therein. In a most preferred process embodiment, the most preferred catalyst will be used and the selective hydrogenation will be accomplished so as to hydrogenate at least 90% of the ethylenic unsaturation initially contained in the polymer while hydrogenating essentially none of the aromatic unsaturation contained therein.

Having thus broadly described the present invention and a preferred and most preferred embodiment thereof, it is believed that the invention will become even more apparent by reference to the following Examples. It will be appreciated, however, that the examples are presented solely for purposes of illustration and should not be construed as limiting the invention unless one or more of the limitations specifically introduced in the Examples are incorporated into the claims appended hereto.

EXAMPLE 1

In this Example, a hydrogenation catalyst was prepared by combining triethylsilicon diethylalumoxane with nickel-2-ethylhexanoate in cyclohexane at a temperature of 25° C. The nickel-2-ethylhexanoate contained about 0.5 moles $H_2O$ per mole of nickel-2-ethylhexanoate. In preparing the catalyst in this Example, the amount of alumoxane combined with nickel-2-ethylhexanoate was controlled so as to produce a hydrogenation catalyst with a mixture having an Al:Ni ratio of 3:1. For convenience, this catalyst will be referred to hereinafter as catalyst No. 1. This catalyst was used shortly after preparation to hydrogenate a block copolymer as summarized in Example 3. Surprisingly, this catalyst appeared to be truly homogeneous.

EXAMPLE 2

In this Example, a catalyst was prepared by combining a nickel-2-ethylhexanoate identical to that used in Example 1 with triethyl aluminum in cyclohexane at a temperature of 25° C. In preparing this catalyst, the nickel-2-ethylhexanoate and triethyl aluminum were combined in an Al:Ni atomic ratio of 2.2:1. This catalyst which is hereinafter referred to as catalyst No. 2, was used shortly after preparation to hydrogenate a block copolymer as summarized in Example 4.

EXAMPLE 3

In this Example, the catalyst prepared in Example 1 (Catalyst No. 1) was used to hydrogenate a linear triblock copolymer comprising terminal polystyrene blocks and a central butadiene polymer block, each polystyrene block having a weight average molecular weight of 7,000 and the polybutadiene block having a weight average molecular weight of 40,000. In the hydrogenation run, the polymer was dissolved in cyclohexane, the solution containing 20 wt % polymer and 80 wt % cyclohexane. In the run, 450 grams polymer solution (90 g of polymer) was charged to an autoclave, the contents of the autoclave blanketed with hydrogen at a hydrogen pressure of about 900 psig and the contents of the autoclave then heated to 70° C. A sufficient amount of catalyst in 50 g cyclohexane was then injected into the autoclave to provide 100 ppm Ni, by weight, based on total solution. After the catalyst was injected, the reaction medium was raised to a temperature of 90° C. The contents of the autoclave were then held at these conditions for three hours while maintaining a hydrogen partial pressure of 900 psig. A sample of the reaction medium was withdrawn from the reactor after 15 minutes, 30 minutes, 60 minutes, 2 hours and at completion of the run and analyzed to determine the % of the initial ethylenic unsaturation which had been saturated. The extent of hydrogenation was determined using an ozone titration. Contacting between the polymer and the ozone was accomplished at 25° C. In this method, the amount of ozone actually reacting with the polymer is determined and this value then used to determine the amount of ethylenic unsaturation remaining. The results actually achieved in the run is summarized in the Table following Example 4.

EXAMPLE 4

In this Example, the catalyst prepared in Example 2 (Catalyst No. 2) was used to selectively hydrogenate a triblock copolymer identical to that used in Example 3. The hydrogenation in the run completed in this Example was completed at conditions identical to those used in Example 3 except that a different catalyst was used. The results obtained with this catalyst are summarized in the following Table.

TABLE

| Catalyst No. | Al:Ni Atomic Ratio | % Initial ethylenic unsat. converted after | | | | |
|---|---|---|---|---|---|---|
| | | 15 min | 30 min | 60 min | 120 min | 180 min |
| 1 | 3:1 | 54.7 | 74.5 | 85.3 | 90.3 | 92.2 |
| 2 | 2.2:1 | 66.4 | 83.0 | 88.5 | 92.7 | 93.4 |

As will be apparent from the data summarized in the preceding Table, the catalyst of this invention, is about equivalent to a well known prior art catalyst which is used commercially to selectively hydrogenate styrene-butadiene and styrene-isoprene block copolymers except that the particular catalyst within the scope of the present invention used in Example 3 was, initially less active than the prior art catalyst. This feature of this particular hydrogenation catalyst will, then, permit far more effective control of partial hydrogenation when this is a desired end result. In this regard, it should be noted that 66.4 of the initial ethylenic unsaturation is converted with catalyst 2 after only 15 minutes and 83% is converted after 30 minutes while the conversion with the catalyst of this invention is only 54.7% after 15 minutes and 74.5% after 30 minutes.

EXAMPLE 5

In this Example, a different hydrogenation catalyst within the scope of this invention was prepared using the same method as was used in Example 1. This catalyst, which catalyst is hereinafter referred to as Catalyst No. 3, was prepared by contacting $(Et_2AlO)_2-SiO_2$ with a nickel-2-ethylhexanoate identical to that used in Example 1. The atomic ratio of aluminum to nickel was maintained at 3:1 in preparing this catalyst.

EXAMPLE 6

In this Example, the catalyst prepared in Example 5 was used to selectively hydrogenate a triblock copolymer identical to that used in Example 3 at the same conditions as were used in Example 3. As in Example 3, samples were withdrawn at 15, 30, 60, 120 and 180 minutes and the extent of hydrogenation determined on each sample using ozone. The results obtained are summarized in the following Table:

TABLE

| Catalyst No. | Al:Ni Atomic Ratio | % Ethylenic unsaturation converted after | | | | |
|---|---|---|---|---|---|---|
| | | 15 min | 30 min | 60 min | 120 min | 180 min |
| 3 | 3:1 | 49.0 | 81.7 | 91.5 | 93.2 | 94.3 |

As will be apparent from the data summarized in the preceding Table, the initial activity of the catalyst used in this Example was less even than that of the catalyst prepared in Example 1 (cf. the of conversion after 15 minutes). After 30 minutes, however, the activity of this catalyst was nearly equal to the activity of a prior art catalyst prepared with triethylaluminum (cf. Catalyst No. 2 of Example 4 with Catalyst No. 3). After 60, 120 and 180 minutes, however, the catalyst tested in this Example was more active than the prior art catalyst (Catalyst No. 2).

EXAMPLE 7

In the Example, a hydrogenation catalyst within the scope of this invention was prepared in a manner identical to that used in Example 1 except that EtAl(OSiEt$_3$)$_2$ was substituted for the Et$_3$SiOAlEt$_2$ used therein. Again, the Al:Ni atomic ratio was controlled at 3:1 during preparation of the catalyst. This catalyst was used shortly after preparation to hydrogenate a triblock copolymer as summarized in Example 8. For convenience, this catalyst is herein referred to as Catalyst No. 4.

EXAMPLE 8

In this Example, the catalyst prepared in Example 7, Catalyst No. 4, was used to selectively hydrogen a polymer identical to that hydrogenated in Example 3. The hydrogenation conditions used were identical to those summarized in Example 3 except that the different catalyst was used. Again, samples were taken at 15, 30, 60, 120 and 180 minutes and the extent of hydrogenation determined for each sample in the same manner as was used in Example 3. The results obtained are summarized in the following Table:

TABLE

| Catalyst No. | Al:Ni Atomic Ratio | % Initial —(—C=C—)— converted after | | | | |
|---|---|---|---|---|---|---|
| | | 15 min | 30 min | 60 min | 120 min | 180 min |
| 4 | 3:1 | 41.8 | 81.5 | 92.5 | 94.9 | 95.6 |

As will be apparent from the data summarized in the previous Table, Catalyst 4, which was prepared with a hydrocarbyl substituted silicon alumoxane containing Si and Al atoms in a ratio of 2:1 was, initially, less active than Catalyst No. 3, which was prepared with a silicon-aluminum compound containing silicon and aluminum atoms in a ratio of 1:2, and Catalyst No. 1 which was prepared with a silicon-aluminum compound containing silicon and aluminum atoms in a ratio of 1:1 (cf. the conversion at 15 min.), but ultimately gave the best total conversion (cf. the conversion after 180 min., for example). Catalyst No. 4 also was intially less active than the prior art catalyst, Catalyst No. 2, (cf. the conversions at 15 and 30 minutes), but ultimately became more active than this prior art catalyst (cf. all conversions at holding times greater than 30 minutes).

EXAMPLE 9

In this Example, a catalyst within the scope of this invention, which catalyst is hereinafter referred to as Catalyst No. 5, was prepared by combining nickel-2-ethylhexanoate containing 0.5 moles of water per mole of ethylhexanoate with (Me$_2$SiO)$_3$ in an amount sufficient to provide a Si:Ni atomic ratio of 3:1 in cyclohexane to form a precatalyst, then this reaction product was reacted with triethyl aluminum in an amount sufficient to provide an Al:Ni atomic ratio of 2:1 in cyclohexane to form the final catalyst. Immediately after preparation, the final catalyst was introduced into an autoclave containing an amount of polymer, identical to that hydrogenated in Examples 3, 4, 6 and 8, and the same amount of cyclohexane. The polymer hydrogenated was also identical to that hydrogenated in the previous Examples. The contents of the autoclave were at 70° C. and under 900 psig hydrogen and contained a sufficient amunt of Ni to provide 100 ppm Ni based on the total amount of polymer and cyclohexane. Immediately after introduction of the final catalyst, the temperature of the contents of the autoclave were raised to 90° C. Samples of the polymer were then withdrawn from the autoclave at 30, 60, 120 and 180 minutes and the extent of hydrogenation for each sample then determined using the same method as is summarized in Example 3. The results actually obtained on each sample are summarized in the following Table:

TABLE

| Catalyst No. | Al:Ni Atomic Ratio | % —C=C— conversion after | | | |
|---|---|---|---|---|---|
| | | 30 min | 60 min | 120 min | 180 min |
| 5 | — | 39.3 | 64.4 | 90.9 | 94.8 |

As will be apparent from the data summarized in the preceding Table, the catalyst prepared in this Example, Catalyst No. 5, was significantly less active than any of the previously tested catalysts, even after 60 minutes, but ultimately this catalyst permitted very good overall conversion (cf. the conversion of all catalysts at 180 min.). This significant reduction in initial activity is attributed in part to the Si:Al atomic ratio (3:2) of the hydrocarbyl-substituted silicon alumoxane used to prepare the catalyst and perhaps partly to the fact that the catalyst was prepared by combining the components in a different order.

The data presented in all of the preceding Examples clearly support the conclusions that (1) catalyst prepared with a hydrocarbyl-substituted silicon alumoxane containing more silicon atom than aluminum atoms afford the greatest reduction in initial hydrogenation activity but ultimately the greatest extent of hydrogenation; (2) catalyst prepared with hdyrocarbyl-substituted silicon alumoxanes having the same number of Si and Al atoms reduced the initial activity the least of any of the silicon-aluminum compounds but retain the reduction in activity for longer reaction times and (3) catalyst prepared with silicon-aluminum compounds having more Al atoms than Si atoms are intermediate of these two extremes. These differences in catalysts can, then, be used as an aid in selecting a catalyst to be used to effect partial hydrogenation as well as an aid in selecting the best catalyst for achieving complete or substantially complete conversion.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the present invention.

Having thus described and illustrated the present invention, what is claimed is:

1. A method for hydrogenating a polymer containing ethylenic and/or aromatic unsaturation comprising the steps of:
    (a) contacting said polymer with hydrogen in a suitable solvent and in the presence of a catalyst prepared by combining a Group VIIIA metal compound with a hydrocarbyl-substituted silicon alumoxane;
    (b) maintaining the contact in step (a) for a sufficient period of time to permit conversion of at least a portion of the ethylenic and/or aromatic unsaturation contained in said polymer; and
    (c) recovering an at least partially hydrogenated polymer.

2. The method of claim 1 wherein the contacting in step (a) is accomplished at a temperature within the range from about 20° C. to about 175° C. at a total pressure within the range from about 50 to about 5,000 psig and at a hydrogen partial pressure within the range from about 50 to about 3,000 psig.

3. The method of claim 2 wherein the contacting in step (a) is continued for a nominal holding time within the range from about 10 to about 360 minutes.

4. The method of claim 1 wherein said Group VIIIA metal compound is selected from the group consisting of metal carboxylates, metal alkoxide, metal chelates, metal salts of hydrocarbyl sulfur-containing acids and metal salts of hydrocarbyl sulfur-containing acid partial esters.

5. The method of claim 4 wherein said Group VIIIA metal compound is a metal carboxylate.

6. The method of claim 5 wherein said Group VIIIA metal carboxylate contains from 1 to about 50 carbon atoms.

7. The method of claim 4 wherein said Group VIIIA metal compound and said hydrocarbyl-substituted silicon alumoxane are combined in a ratio sufficient to provide an aluminum to Group VIIIA metal atomic ratio within the range from about 0.5:1 to about 20:1.

8. The method of claim 7 wherein said Group VIIIA metal is selected from the group consisting of cobalt, nickel and palladium.

9. The method of claim 8 wherein said Group VIIIA metal is nickel.

10. The method of claim 9 wherein said Group VIIIA metal compound is nickel-2-ethylhexanoate.

11. The method of claim 1 wherein said hydrocarbyl-substituted silicon alumoxane contains more silicon atoms than aluminum atoms.

12. The method of claim 11 wherein said hydrocarbyl-substituted silicon alumoxane contains a plurality of silicon atoms and a single aluminum atom.

13. The method of claim 1 wherein said hydrocarbyl-substituted silicon alumoxane contains more aluminum atoms than silicon atoms.

14. The method of claim 13 wherein said hydrocarbyl-substituted silicon alumoxanes contains a plurality of aluminum atoms and a single silicon atom.

15. The method of claim 1 wherein said hydrocarbyl-substituted silicon alumoxane contains the same number of aluminum atoms and silicon atoms.

16. The method of claim 15 wherein said hydrocarbyl-substituted silicon alumoxane contains a single aluminum atom and a single silicon atom.

17. The method of claim 1 wherein the contacting in step (a) is accomplished at a temperature within the range from about 20° C. to about 100° C. at a total pressure within the range from about 100 to about 1,000 psig and at a hydrogen partial pressure within the range from about 50 to about 950 psig.

18. The method of claim 17 wherein the contacting in step (a) is continued for a nominal holding time within the range from about 30 to about 240 minutes.

19. The method of claim 18 wherein said Group VIIIA metal compound and said hydrocarbyl-substituted silicon alumoxane are combined in a ratio sufficient to provide an aluminum to Group VIIIA metal atomic ratio within the range from about 1:1 to about 10:1.

* * * * *